G. F. FISHER.
TIRE.
APPLICATION FILED JULY 15, 1915.
1,183,965.  Patented May 23, 1916.
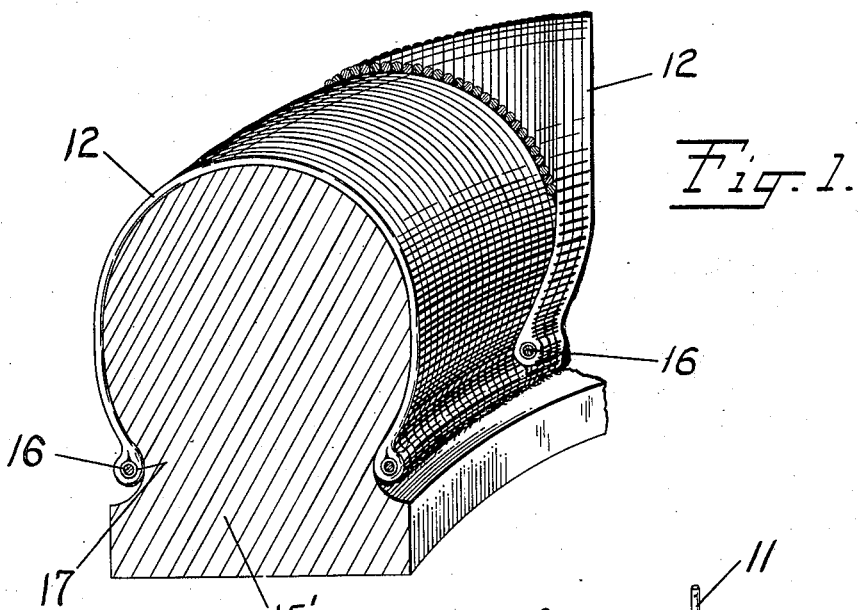
Fig. 1.
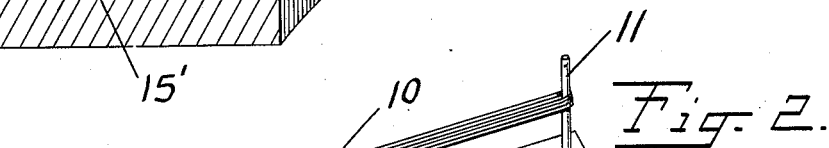
Fig. 2.
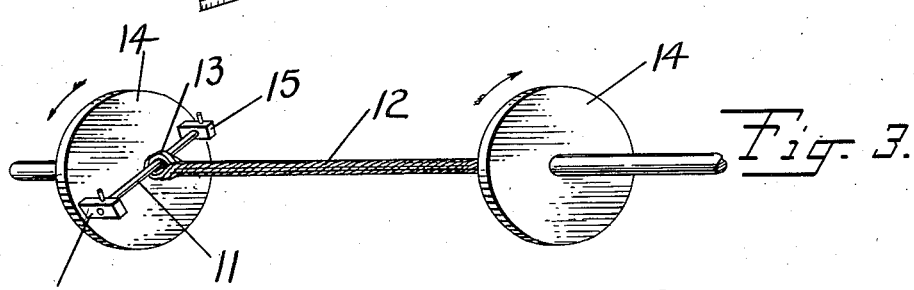
Fig. 3.
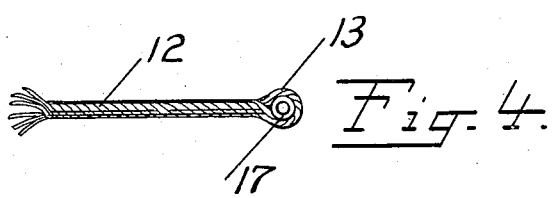
Fig. 4.
Fig. 5.
WITNESS:
S. L. Taylor.
INVENTOR
George F. Fisher
BY
Ernest Hopkinson
HIS ATTORNEY

UNITED STATES PATENT OFFICE.

GEORGE F. FISHER, OF PLAINFIELD, NEW JERSEY, ASSIGNOR TO MORGAN & WRIGHT, A CORPORATION OF MICHIGAN.

TIRE.

1,183,965.   Specification of Letters Patent.   Patented May 23, 1916.

Application filed July 15, 1915. Serial No. 39,978.

*To all whom it may concern:*

Be it known that I, GEORGE F. FISHER, a citizen of the United States, and a resident of Plainfield, county of Union, and State of New Jersey, have invented certain new and useful Improvements in Tires, of which the following is a full, clear, and exact description.

This invention relates to tires and has for an object to provide a tire embodying in the carcass or textile portion thereof independent cords of novel construction stretched from bead to bead under identical tension.

A further object is to provide a tire embodying twisted cords formed with integral loops at the ends of uninterrupted continuity with the body of the cord.

The invention can be readily understood from the following description taken in connection with the accompanying drawing, in which:

Figure 1 is a fragmentary perspective view showing a method of building a tire in accordance with my invention; Fig. 2 is a perspective view illustrating a step in forming my improved cord; Fig. 3 is a perspective view showing the twisting step; Fig. 4 is a perspective view of the loop of the cord reinforced; Fig. 5 is a cross-sectional view of the cord.

In carrying out the invention I preferably take a long filamentary element 10 which may or may not in itself be composed of twisted strands, and pass the same around spaced pegs 11 in the nature of an endless loop embodying a plurality of convolutions. I then rotate the pegs relatively thereby producing a twist the entire length of the endless loop. This produces a short twisted cord 12 having integral loops 13 at the ends of uninterrupted continuity with the body of the cord. The result is that the loops at the ends will be as strong as the body portion of the cord since they are devoid of breaks, joints, or the like. The twisting of the cord may be accomplished manually, or mechanically, as for instance, by means of driven members 14 to which the pegs 11 are movably secured, as shown at 15, and both members may turn or but one may turn as desired.

The cords 12 formed as above described are laid on the ring core 15' preferably radially thereof, although they may be laid diagonally or at any other angular relation as desired, and are connected together at the ends by retaining wires 16 which pass through the loops 13 of the cords and subsequently form the beads of the finished tire. If desired, the loops 13 may be reinforced by metal eyes, one of which is shown at 17.

It is desirable that each cord be treated with rubber in an unvulcanized condition and this rubber treating step may be performed at any stage of the manufacture of the tire. In one embodiment, the filamentary element may be initially coated or otherwise treated with rubber before being applied to the pegs 11, and in this embodiment the resultant cord will embody twisted strands 18 separated by and surrounded with a cushion 19 of rubber. In another embodiment of the invention I may apply the rubber to the cords after the same have been laid on the ring core in a complete ply, or a portion of a ply, or after any number of plies have been laid.

The cords constructed as above described are stretched from bead wire to bead wire of the tire and preferably they are laid under equal or uniform or identical tension throughout, whereby uniformity in tension throughout the textile portion or carcass of the tire will result.

The tire material produced by the above method will exhibit as to structural characteristics, a filamentary element doubled together to form a terminal loop at each end, and twisted upon itself between said terminal loops. The loops at the ends will be substantially free from twist, that is, will exhibit only the slight twist caused by the filamentary element in the loops adjusting itself while the filamentary element is being twisted upon itself between the loops, and that is what is meant in the claims wherever the terminology "substantially free from twist" is used.

What is claimed is:

1. A twisted cord comprising a plurality of convolutions of fibrous material twisted longitudinally to near the terminals of the same, said terminals being substantially free from twist and constituting loops integral with the body portion of the cord.

2. A tire embodying a plurality of independent cords each comprising a filamentary element doubled together to form a loop at each end and twisted upon itself between the loops.

3. A tire embodying a plurality of independent cords each comprising a rubber treated filamentary element doubled together to form a loop at each end and twisted upon itself between the loops.

4. A tire embodying a plurality of independent cords each comprising a filamentary element doubled together to form a loop at each end and twisted upon itself between the loops, and retaining means passed through said loops.

5. A twisted cord comprising a plurality of convolutions of rubber treated fibrous material twisted together to near the terminals of the same, said terminals being substantially free from twist and constituting loops.

6. A tire embodying in the carcass portion a plurality of independent elements each formed of convolutions of fibrous material twisted longitudinally to near the terminals of the same, said terminals being free from twist and constituting loops integral with the body portion of the element, and retaining means engaging in said loops.

Signed at New York city, county of New York, and State of New York, this 13th day of July, 1915.

GEORGE F. FISHER.